United States Patent [19]
Corona

[11] 3,990,802
[45] Nov. 9, 1976

[54] ELECTRIC MOTOR WITH REMOVABLE SHAFT ASSEMBLY

[76] Inventor: Thomas Corona, 10240 Janice St., Baton Rouge, La. 70816

[22] Filed: Mar. 17, 1975

[21] Appl. No.: 558,633

[52] U.S. Cl. ............................. 403/24; 64/5; 29/123; 310/42; 403/26
[51] Int. Cl.² ......................................... F16B 1/00
[58] Field of Search ............... 64/5, 1 C; 29/123; 74/230.01, 230.3, 24, 42; 403/26, 337; 310/42

[56] References Cited
UNITED STATES PATENTS

| | | | |
|---|---|---|---|
| 142,530 | 9/1873 | Thomas | 64/5 |
| 2,676,279 | 4/1954 | Wilson | 403/337 |
| 3,013,487 | 12/1961 | Faeber | 29/123 UX |
| 3,892,986 | 7/1975 | Allen | 310/42 |

*Primary Examiner*—Andrew V. Kundrat
*Attorney, Agent, or Firm*—Roy, Kiesel, Patterson, Hudson & Abadie

[57] ABSTRACT

An electric motor having a removable shaft assembly comprising a plate member attached to the motor core, an assembly shaft, and a bearing arrangement attached at one end to the assembly shaft and at the other end to the plate member.

2 Claims, 3 Drawing Figures

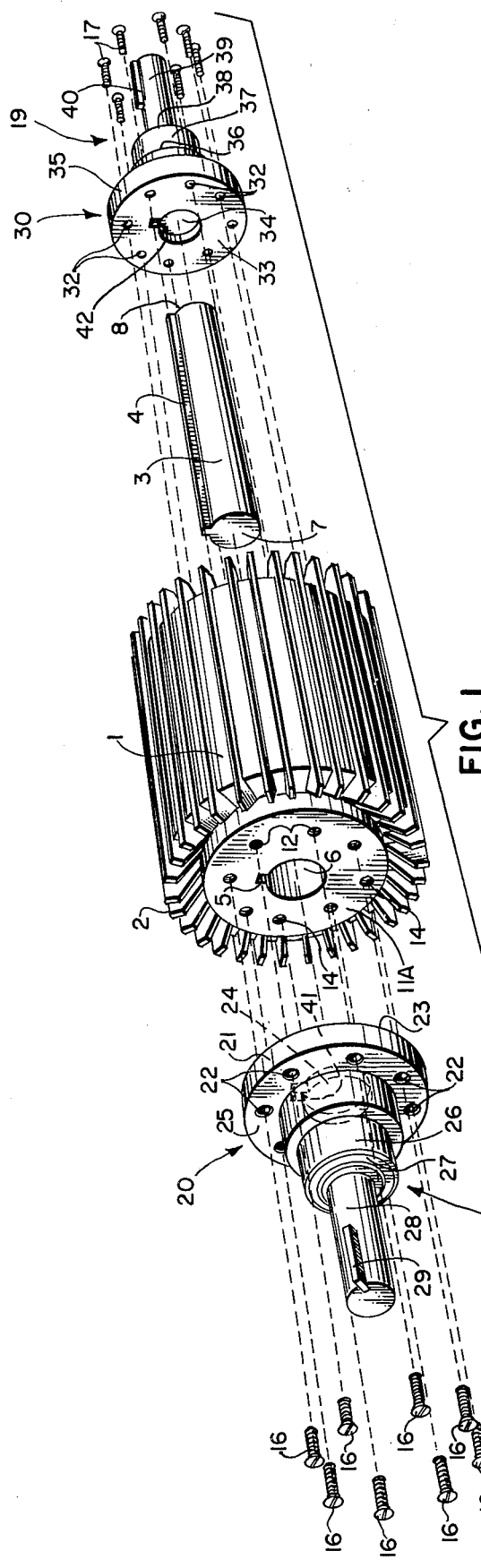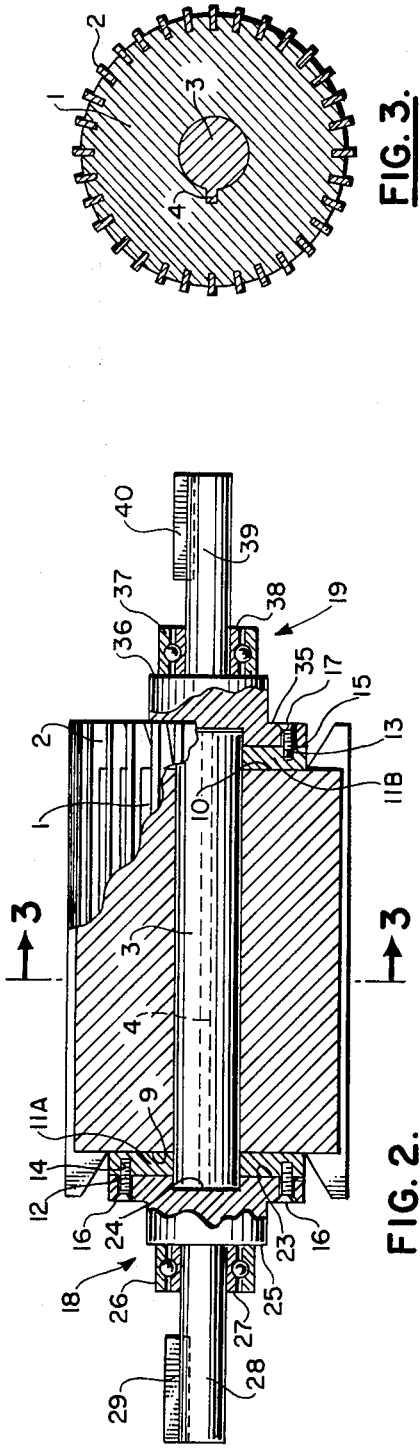

ELECTRIC MOTOR WITH REMOVABLE SHAFT ASSEMBLY

BACKGROUND OF THE INVENTION

1. Field of the Invention

This invention relates generally to motor construction and more particularly to electric motors having a removable shaft assembly.

2. Prior Art

A general cause of most electric wound motor failures is damage to the motor shaft. This can be caused by heavy objects dropping on the shaft or simply due to the stresses placed on the shaft through prolonged use. The repair of the damaged shafts presently presents a problem, particularly, large industrial motors.

To repair the present motor shafts requires the pressing out of the entire shaft and then repairing or replacing after the motor core has been reworked. This operation in most cases cannot be done on-site, but must be done in specially equipped machine shops. The results in greater down-time of the motor and in the case of large, heavy electric motors expensive transportation costs.

SUMMARY OF THE INVENTION

It is therefore an object of this invention to provide an electric motor whose shaft can be repaired or replaced on-site.

Another object of this invention is to provide an electric motor whose shaft can be repaired or replaced easily and quickly.

These and other objects and advantages of this invention will become apparent from the ensuing descriptions of the invention.

Accordingly, an electric motor is provided having a removable shaft assembly attached to the motor core wherein the removable shaft assembly has a plate member detachably attached in a locking arrangement to the motor core, a shaft, a bearing arrangement attached to the removable shaft at one end and to the plate member at another end.

BRIEF DESCRIPTION OF THE DRAWINGS

FIG. 1 is an exploded, perspective view of an electric motor designed according to one embodiment of this invention.

FIG. 2 is a cross-sectional view taken along lines 2 — 2 of FIG. 1.

FIG. 3 is a cross-sectional view taken along lines 3 — 3 of FIG. 1.

PREFERRED EMBODIMENTS OF THE INVENTION

While this invention is applicable to numerous types of electric motors, its preferred embodiments will be described, without any intention of limiting the scope of this invention, with the use of a wound or "Squirrel cage" rotor motor shown in FIGS. 1 – 3.

The motor has a core 1 having cooling blades 2 attached along the length of core 1. Through the center of core 1 runs a shaft 3 having a key member 4 shaped to fit in core groove 5, located in core opening 6. Shaft 3 is of sufficient length so that when it is inserted in core opening 6, shaft ends 7 and 8 will protrude beyond core end surfaces 9 and 10, respectively, as well as, beyond core end plate member 11A and 11B, respectively.

Core end plate members 11A and 11B will be provided with cavities 12 and 13, respectively, having threaded side walls 14 and 15, respectively, to receive threaded bolts 16 and 17, respectively.

Attached to core end plate members 11A and 11B by bolts 16 and 17, respectively, are removable shaft assemblies 18 and 19, respectively. Removable shaft assembly 18 has a plate member 20 with a shoulder section 21 provided with openings 22 which are aligned with core cavities 12 and through which bolts 16 may pass. Shoulder section 21 has end surface 23 provided with a plate cavity 24 shaped to receive shaft 3 and key member 4 in a non-twist or locking arrangement. Attached to plate member 20 on surface 25 is a bearing assembly 26. Extending out from bearing assembly end 27 is shaft 28 which can be provided with a keying member 29 for connecting to other attachments not shown.

Similarly, removable shaft assembly 19 has a plate member 30 with a shoulder section 35 provided with openings 32 which are aligned with core cavity 13 and through which bolts 17 may pass. Shoulder section 35 has end surface 33 provided with a cavity 34 shaped to receive shaft 3 and key member 4 in a non-twist or locking arrangement. Attached to plate member 30 on surface 36 is a bearing assembly 37. Extending out from bearing assembly end 38 is shaft 39 which can also be provided with a keying member 40 for connecting to other attachments not shown.

When bolts 16 and 17 are screwed into cavities 14 and 15, respectively, the removable shaft assemblies 18 and 19, respectively, will be securingly attached to core 1 and prevented from twisting by key element 4 that fits flush in a slot 41 of cavity 24 and slot 42 of cavity 34. Now in the case that either shaft 28 or 39 become damaged, they may be replaced on site by simply unscrewing bolts 16 or 17, removing the damaged assembly 18 or 19, and locking a new assembly in place. The damage assembly can then either be repaired on site, or if the proper equipment is not available, sent to a repair shop with loss of additional down time. Also, since only the shaft assembly must be sent to the repair shop, deliver charges are reduced substantially.

Other embodiments and modifications are obvious from the above descriptions of the invention are to be included in the broad scope of this invention.

Having described my invention, what I claim as new, novel, useful and unobvious, and desire U.S. Letters Patents is:

1. An electric motor which comprises
  a. a keyed shaft fixedly attached to and extending through a core, said shaft extending beyond said core's end; and
  b. a shaft assembly comprising
    i. a plate member which is removably attached to said core, said plate member having a plate cavity shaped to receive said keyed shaft in a locking arrangement.
    ii. a second shaft, and
    iii. a bearing assembly fixedly attached to said plate member, said second shaft rotatably attached to said bearing assembly and protruding outward therefrom and away from said plate member.

2. An electric motor according to claim 1 wherein
  a. said core end has core cavities threaded to receive threaded bolts and
  b. said plate member has openings which are positionally matched to said core cavities when said plate member is placed adjacent to said core end, and
  c. threaded bolts to attach said removable shaft assembly to said core when screwed into said core cavities.

* * * * *